United States Patent [19]

Berry et al.

[11] E Re. 29,643

[45] Reissued * May 30, 1978

[54] LOCKING BARS

[75] Inventors: Daniel Victor Berry, Bracknell; Stanley Gerald Thomas Knott, Wadhurst, both of England

[73] Assignee: Ingersoll Locks, Limited, England

[ * ] Notice: The portion of the term of this patent subsequent to Mar. 23, 1988, has been disclaimed.

[21] Appl. No.: 536,470

[22] Filed: Dec. 26, 1974

Related U.S. Patent Documents

Reissue of:

[64] Patent No.: 3,638,460
Issued: Feb. 1, 1972
Appl. No.: 95,257
Filed: Jan. 5, 1971

U.S. Applications:

[63] Continuation of Ser. No. 73, Feb. 2, 1970, abandoned.

[51] Int. Cl.[2] ..... E05B 67/02; E05B 67/22
[52] U.S. Cl. ..... 70/52; 70/39
[58] Field of Search ..... 70/13, 51, 52, 54, 55, 70/56; 292/281-286

[56] References Cited

U.S. PATENT DOCUMENTS

| | | | |
|---|---|---|---|
| 1,546,021 | 7/1925 | Parmele | 70/13 X |
| 2,104,981 | 1/1938 | Falk | 70/33 |
| 2,541,638 | 2/1951 | Clevett | 70/56 |
| 3,345,837 | 10/1967 | Barnes | 70/52 |

FOREIGN PATENT DOCUMENTS

| | | | |
|---|---|---|---|
| 381,399 | 10/1923 | Germany | 70/52 |
| 413,366 | 4/1946 | Italy | 70/55 |
| 414,307 | 7/1946 | Italy | 70/55 |

*Primary Examiner*—Robert L. Wolfe
*Attorney, Agent, or Firm*—Larson, Taylor and Hinds

[57] ABSTRACT

[A locking bar adapted to cooperate with a shackle of a padlock, which locking bar comprises a shackle-receiving orifice and an abutment provided on the surface of said bar, the arrangement being such that with the padlock secured to the bar by means of a padlock shackle passing through said orifice, the abutment is adapted to engage with the body and/or shackle of the padlock to restrain substantial rotation of said padlock about the orifice in said bar.]

*An improved padlock construction having a body defining an upper surface and a bottom surface. Access to a locking mechanism is provided through the bottom surface, while the top surface is designed so that the body can receive a shackle and portions of locking bars in locking engagement. To achieve this purpose a cruciform-shaped depression is provided in the top surface, which depression extends downwardly into the padlock body. The depression comprises a first area adapted to receive dependent leg portions of the shackle and a second area transverse to and intersecting the first area for receiving the perforated ends of the locking bars. The portion of the body of the padlock defining the recess is designed so that when the shackle and locking bars are in a locking engagement, the shackle is substantially completely accommodated within said depression in an inaccessible position.*

2 Claims, 2 Drawing Figures

LOCKING BARS

Matter enclosed in heavy brackets [ ] appears in the original patent but forms no part of this reissue specification; matter printed in italics indicates the additions made by reissue.

This is a streamlined continuation of application Ser. No. 73, filed Jan. 2, 1970 *now abandoned.*

The present invention relates to [locking bars] *an improved padlock construction* and [has particular reference to a locking bar adapted to be used in combination with padlocks forming the subject of] *contains subject matter in common with* our copending application Ser. No. 794,250, filed Jan. 27, 1969 now U.S. Pat. No. 3,572,064 issued Mar. 23, 1971.

Our copending application Ser. No. 794,250 [provides a padlock] *relates to an improved lock construction* comprising a shackle adapted to engage one or more members to be locked, a casing adapted to accommodate said shackle in a locking position and provided with a recess adapted to accommodate part of said member or members when the shackle is in the locking position, said shackle having a member engaging portion which with the shackle in said locking position engages member the members to be locked the arrangement being such that in use with the shackle in the locking position at least part of the member engaging portion of the member or members adapted to be engaged thereby is accommodated by said recess. In a preferred embodiment of the padlock described above the body of the padlock is provided with an extended portion built up on the side of the padlock which serves to close one end of the recess therein.

It will be appreciated that with a normal locking bar comprising a plate extending from the member to be locked having an eye towards the outer end of the plate in the locking position of the preferred embodiment of the padlock described above the shackle and the end of the locking bar itself will be protected by means of the built-up portion of the padlock body closing said one end of the transverse recess in the top thereof. However, attack on the padlock, although hindered by the construction of the padlock body, is still possible since it is possible to lift the padlock from its normal hanging position to rotate it about the axis of that part of the shackle passing through the eye in the locking bar until the underside of the padlock, that is to say, the open end of the transverse recess in the top of the padlock body, is exposed and the portion of the shackle bridging the walls of the recess, where not covered or protected by the locking bars themselves, is potentially open for attack by cropping tools, wedges and the like.

[According to the present invention, there is provided] *There is disclosed herein* a locking bar adapted to cooperate with the shackle of a padlock which locking bar comprises a shackle receiving orifice and an abutment provided on the surface of said bar the arrangement being such that with the padlock secured to the bar by means of a padlock shackle passing through said orifice, the abutment is adapted to engage with the body and/or shackle of the padlock to restrain substantial rotation of said padlock about the orifice in said bar.

The present invention [also includes] *is specifically concerned with* locking means comprising a padlock [and] *which is adapted for use with* one or more locking bars adapted to be secured by said padlock[, wherein the]. *The* padlock [comprising] *comprises* a shackle adapted to engage with said bar or bars, a casing adapted to accommodate said shackle in a locking position and provided with a recess adapted to accommodate part of said bar or bars when the shackle is in the locking position, said shackle having a bar engaging portion which with the shackle in the locking position engages with the bar or bars to be locked and wherein the locking bars comprises a shackle receiving orifice and an abutment provided on the surface of said bar, the arrangement being such that in use with the shackle passing through the shackle receiving orifice of the bar or bars and in the locking position with respect to the casing of the padlock, the bar engaging portion of the shackle and the bar or bars engaged thereby is accommodated within said recess and the abutment is adapted to engage the casing and/or shackle of the padlock to restrain substantial rotation of said padlock about the shackle receiving orifice in the bar.

In a particular embodiment of the present invention the recess extends transversely across the shackle receiving portion of the padlock body and the body of the padlock is extended on one side and built up to close the groove on said side the arrangement being such that in the locking attitude the shackle of the padlock is substantially completely accommodated within the padlock body.

A locking bar or bars may each comprise a flat plate tapering towards one end and provided at said one end with an eye or shackle receiving orifice. The said one end of the plate is provided adjacent said eye with a rounded portion which is adapted to pass into the open end of the recess in the padlock, the rounded extremity being adapted to abut the inner surface of the wall closing the recess on the other side of the body of the padlock, the arrangement being such that the padlock shackle is adapted to pass through the eye of each of said bars in order to maintain said bars in a locked relation one to the other. Each bar may be provided forward of the body of the padlock in the locked position with an upstanding abutment, which, on moving the padlock upwardly to abut the upper surface of the padlock, prevents substantial rotational movement of the padlock and prevents the open part of the recess being exposed thereby hindering attack on the shackle with cropping tools, saws and the like.

Following is a description by way of example and with reference to the accompanying drawings of a typical locking bar in accordance with the present invention.

Figure 1:
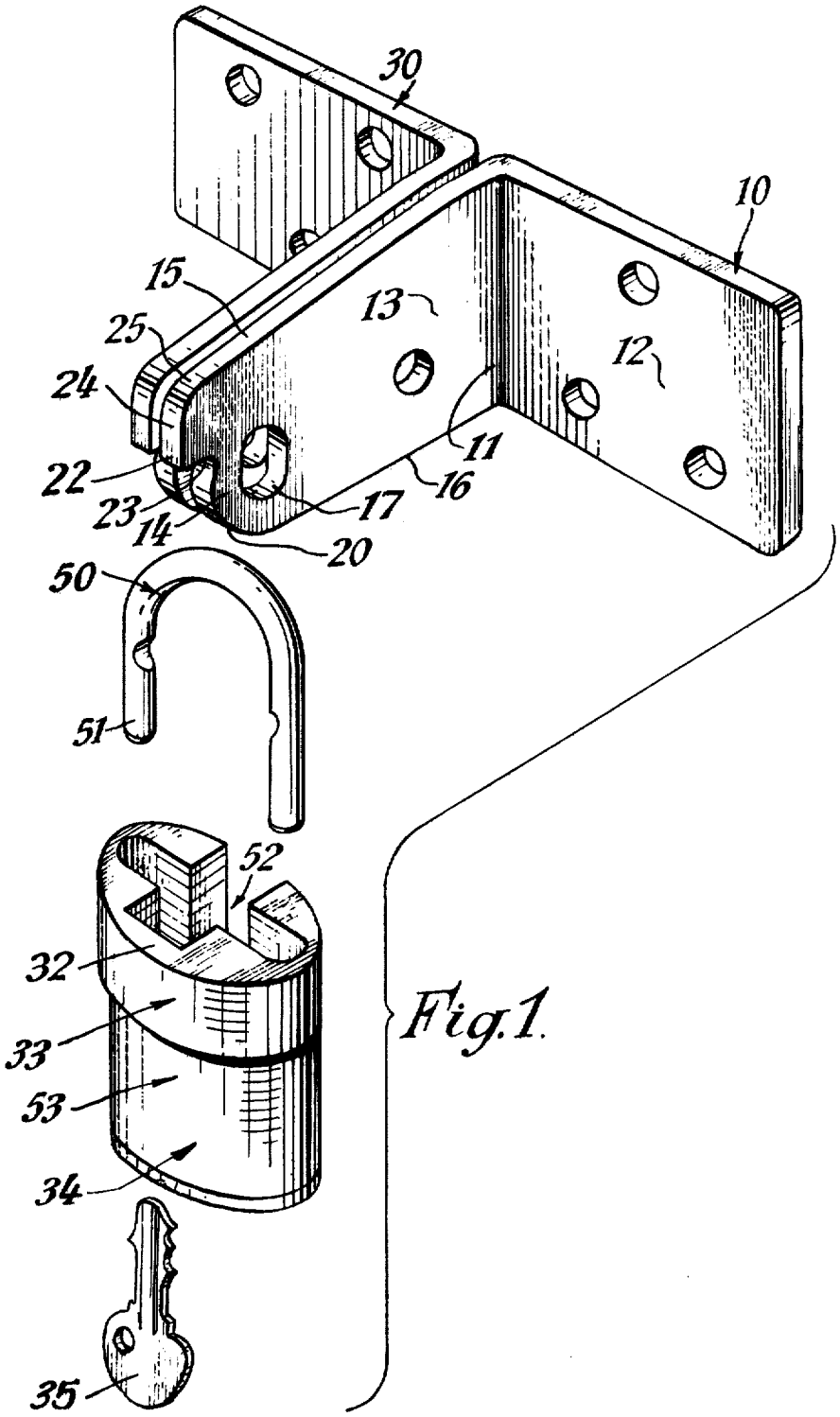
FIG. 1 is an exploded view of a padlock and locking bar assembly *illustrating a padlock construction according to the present invention.*

A locking bar 10 comprises an elongate steel strip substantially three-tenths inch thick, said strip being angled at 11 towards its center thereof to provide a first portion 12 adapted to be fixed and/or secured to an item to be locked or closed, for instance a door, and [the] *a* second portion *or tongue* 13 projecting forwardly from said door or other item to be secured to form a tongue having a forward end 14, a top edge 15 and a bottom edge 16 and flat sides. The tongue 13 is provided with a substantially circular drilling or eye 17 towards the bottom edge 16 at the forward end of the tongue 13, said eye 17 being adapted to accommodate the curved bar engaging portion 50 of a U-shaped padlock shackle *or staple* 51.

The forward end 14 of the tongue 13 is defined by a curved portion 20 extending upwardly from the bottom edge 16, said curved portion 20 being adapted to be [entered into the transverse recess 52 of a cooperating padlock 530.] *received in a cruciform depression 52 in a flat upper surface 32 of a built up and extended first body portion 33 of a padlock body 52.* The curved portion 20 of the tongue 13 defining the junction between the bottom edge 16 and the forward end 14 of the locking bar terminates at a longitudinal plane of the tongue 13, just upwardly of the uppermost extremity of the shackle receiving eye 17 in a forwardly extending abutment 22 having a downwardly disposed abutment surface 23. The forward extremity 24 of the abutment 22 extends upwardly from the abutment surface 23 and forms a convexly curved upper edge 25 to terminate in the upper edge 15 of the tongue 13.

A similar bar 30 is secured to the other element such as a second door or an adjacent door post and in use the two bars are located side by side with eyes arranged to correspond for the passage of the shackle 51 [of a padlock of the kind described in copending application Ser. No. 794,250 now U.S. Pat. No. 3,572,064] and with the abutments 22 on each bar forming a substantially continuous surface from one bar to the other.

Figure 2:
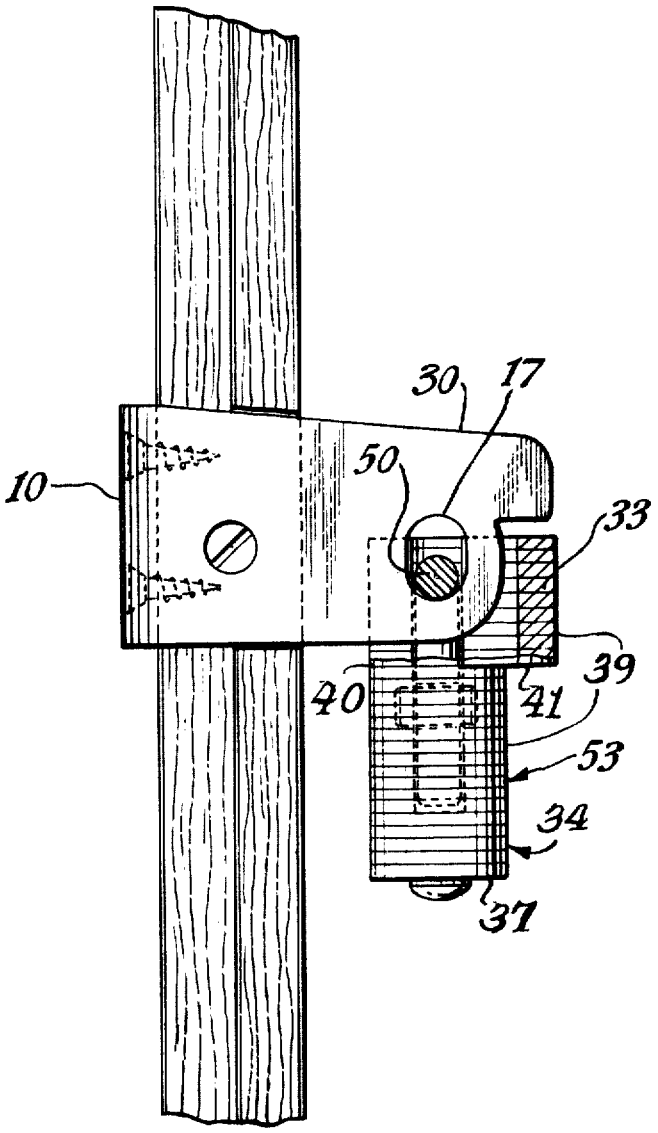
FIG. 2 is a side view of the assembly shown in FIG. 1.

The padlock shackle 51 is passed through the eyes of the locking bars so that the arcuate portion 50 of the padlock shackle 51, that is to say, the bar engaging portion thereof bridging the pair of spaced limbs of the shackle, is accommodated within the eye 17 of each bar. [With the padlock in] *The downwardly depending legs of the shackle 51 are received within a first recessed area of the depression 52 formed in the flat upper surface 32 of the first body portion 33 of the padlock body 53. The forward end of tongue 13 of the locking bar 10 and the corresponding end of the tongue of the locking bar 30 are received in a second recessed area of depression 52 which extends transverse to and intersects the first recessed area. The first body portion 33 has shielding walls which close off opposite ends of the first recessed area and a second shielding wall which closes off one end of the second recessed area, the shielding walls forming a unitary part of the first body portion which may be made of laminar plates. The flat upper surface 32 of the first body portion 33 and the shielding walls are located in a single plane not substantially lower than the staple when the padlock is in the locked position, the flat upper surface of the first body portion being continuous except for the depression 52.* With the padlock in the locked position, the flat upper surface 32 of the [extended] *first body* portion 33 of the padlock body [34] *53* is adapted to be disposed near the downwardly disposed abutment [surface] 22 [so] *of the locking bars 10, 30 so* that an attempt to move the padlock body [34] *53* arcuately upwardly about the axis of that portion of the shackle 51 passing through the eyes 17 in the locking bars brings the extended portion 33 of the padlock body [34] *53* into abutting relationship with the [abutment] *abutments* 22 [on] *of* the [bar] *locking bars* to prevent substantial rotation of the padlock *relative to the locking bars* and to prevent access to the underside of the padlock containing the open end of the recess 52 therein. In the locked position, the padlock shackle 51 is substantially completely shielded by the built up and extended portion 33 of the padlock [body 34] *53* and by the locking bars themselves and an attempt to move the padlock arcuately upwardly as described above is substantially prevented thus hindering the use of cropping tools and the like to attack the shackle [of the padlock] from the underside thereof. *Further, as is illustrated in FIGS. 1 and 2, the size of the second recessed area of depression 52 relative to the forward ends of the tongues of the locking bars 10, 30 received therein is such that the tongues substantially fill this second recessed area.*

*The padlock body 53 also includes a second, lower body portion 34 within which a locking mechanism is housed. The locking mechanism is not shown for clarity. The locking mechanism may be engaged by a key 35 which is received within a key slot (not shown) in a bottom surface 37 of the second body portion 34. Both the first body portion 33 and the second body portion 34 define a front wall 39 and a rear wall 40 when viewing the padlock in the direction of the arrow A in FIG. 2. The front wall 39 is discontinuous, i.e., has a stepped portion, due to the forwardly extending nature of the first body portion 33. As a result the first body portion 33 defines a lower wall 41. The padlock body 53, consisting of the first body portion 33 and the second body portion 34, is a unitary structure which is not separable during ordinary use.*

It will be appreciated from the foregoing that only one of the locking bars need be provided with an upstanding abutment but for improved security, it is preferred that an abutment be provided on each bar.

We claim:

[1. An improved lock construction comprising a main body portion, a top wall portion arranged for introduction of a staple therewithin, front and rear wall portions, a bottom wall portion including a locking mechanism extending internally thereof and actuatable from without, and adapted for releasable interengagement with the staple to maintain said staple in a locking position, said top wall also including a cruciform-shaped depression extending downwardly toward the main body portion and terminating in a perforated shelf area, the cruciform-shaped depression comprising a first area adapted to receive dependent leg portions of the staple and a second area intersecting said first area for entry of perforated locking bars including a portion to be secured to said lock by said staple, said top wall portion including a forwardly projecting stepped portion arranged to extend beyond and overhand a limited area of the front wall, said stepped portion further including a terminus.]

[2. An improved padlock construction comprising a padlock body including a first body portion having a surface arranged for introduction of a staple therewithin, a second body portion including a locking mechanism extending internally thereof and actuatable from without and adapted for releasable interengagement with the staple to maintain said staple in a locking position, a cruciform depression extending through the surface of said first body portion towards said second body portion, said cruciform depression comprising a first area adapted to receive dependent leg portions of the staple, a second area intersecting said first area for entry of perforated locking bars including a portion to be secured to said padlock by said staple, first shielding portions in outwardly covering relation to opposite ends of said first area, a second shielding portion in covering relation to one end of said second area, said shielding portions forming an uninterrupted protective shield for one end of said second area and for each end of said first area.]

[3. A padlock as claimed in claim 2, in which the first body portion is made of laminated plates and the shielding portions are integral parts of said laminated plates.]

[4. A padlock as claimed in claim 3, in which the first and second body portions are part of a unitary structure which is not separable during ordinary use of the device.]

[5. A padlock construction as claimed in claim 2, in which said shielding portions form a unitary part of said first body portion, and the top surface of said body portion with said shielding portions is a single plane located at a point not substantially lower than the top of said staple when assembled with the padlock body, said top surface being continuous except for the cruciform depression.]

[6. A padlock construction as claimed in claim 5, in which said first and second body portions form a unitary structure which cannot be separated in ordinary use of the device.]

[7. An improved lock construction as claimed in claim 1 wherein the shelf area lies in a plane substantially coextensive with the terminus of said stepped portion.]

*8. An improved padlock construction for securing perforated locking bars, said padlock construction comprising a U-shaped shackle and a padlock body, said padlock body including a first end portion having an end surface thereof arranged for the introduction of the U-shaped shackle therewithin, a second end portion including a locking*

*mechanism, extending internally thereof and actuatable from an end surface of said second end portion, for releasable interengagement with the shackle to maintain said shackle in a locking position, said body further including a cruciform depression extending inwardly from the end surface of said first end portion towards said second end portion, the side walls of said padlock body closing the ends of three arms of said cruciform depression and the fourth arm of said cruciform depression being open on one side of the padlock body, the first and second closed arms of the cruciform depression receiving the legs of the U-shaped shackle and substantially completely accommodating the U-shaped shackle when the shackle is in said locking position, and the third closed arm of the cruciform depression and the fourth open arm of the cruciform depression receiving the perforated locking bars to be secured together by the shackle of the padlock so that, in use, the perforated locking bars project through the side wall of the padlock and extent into the third and fourth arms of the cruciform depression.*

*9. An improved padlock construction as claimed in claim 8 wherein the sizes of said third and fourth arms of said cruciform depression in relation to the locking bars are such that, in use, the portions of the locking bars received therein substantially fill said third and fourth arms, the padlock body, in use, being disposed relative to the locking bars such that when the locking bars lie in vertical planes the padlock body is positioned beneath the locking bars.*

* * * * *